United States Patent
Yang et al.

(10) Patent No.: US 10,784,719 B2
(45) Date of Patent: Sep. 22, 2020

(54) WIRELESSLY POWERED UNMANNED AERIAL VEHICLES AND TRACKS FOR PROVIDING WIRELESS POWER

(71) Applicant: Intel Corporation, Santa Clara, CA (US)

(72) Inventors: Songnan Yang, San Jose, CA (US); Zhen Yao, San Jose, CA (US); Essam Elkhouly, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 570 days.

(21) Appl. No.: 15/406,156

(22) Filed: Jan. 13, 2017

(65) Prior Publication Data

US 2018/0201370 A1    Jul. 19, 2018

(51) Int. Cl.
| | |
|---|---|
| *H02J 50/10* | (2016.01) |
| *B64C 39/02* | (2006.01) |
| *B60L 5/00* | (2006.01) |
| *B60L 53/12* | (2019.01) |
| *B60L 53/30* | (2019.01) |
| *H02J 7/02* | (2016.01) |
| *H02J 50/90* | (2016.01) |

(52) U.S. Cl.
CPC .............. *H02J 50/10* (2016.02); *B60L 5/005* (2013.01); *B60L 53/12* (2019.02); *B60L 53/32* (2019.02); *B64C 39/024* (2013.01); *B60L 2200/10* (2013.01); *B64C 2201/066* (2013.01); *H02J 7/025* (2013.01); *H02J 50/90* (2016.02); *Y02T 10/7005* (2013.01); *Y02T 10/7241* (2013.01)

(58) Field of Classification Search
CPC ....................................................... H02J 50/10
See application file for complete search history.

(56) References Cited

U.S. PATENT DOCUMENTS

| | | | |
|---|---|---|---|
| 2011/0034254 A1 | 2/2011 | Toler | |
| 2014/0375258 A1 | 12/2014 | Arkhipenkov et al. | |
| 2015/0208180 A1* | 7/2015 | Martius .................. | H04R 25/30 |
| | | | 381/315 |
| 2015/0371771 A1 | 12/2015 | Abu Qahouq | |
| 2016/0158638 A1 | 6/2016 | Olsen | |
| 2016/0297522 A1 | 10/2016 | Brulez et al. | |
| 2018/0043782 A1* | 2/2018 | Ng ......................... | B64C 39/024 |

FOREIGN PATENT DOCUMENTS

DE       202016003969 U1 *  9/2017   ........... B64C 39/024

OTHER PUBLICATIONS

International Searching Authority, "Written Opinion," issued in connection with International Patent Application No. PCT/US2017/060555, dated Feb. 20, 2018, 8 pages.
International Searching Authority, "International Search Report," issued in connection with International Patent Application No. PCT/US2017/060555, dated Feb. 20, 2018, 3 pages.

* cited by examiner

*Primary Examiner* — Daniel J Cavallari
(74) *Attorney, Agent, or Firm* — Hanley, Flight & Zimmerman, LLC

(57) ABSTRACT

Example wirelessly powered unmanned aerial vehicles and tracks for providing wireless power are described herein. An example apparatus includes a track section having a transmitter coil to generate an alternating magnetic field and an unmanned aerial vehicle having a receiver coil. The alternating magnetic field induces an alternating current in the receiver coil when the unmanned aerial vehicle is disposed in the alternating magnetic field.

16 Claims, 12 Drawing Sheets

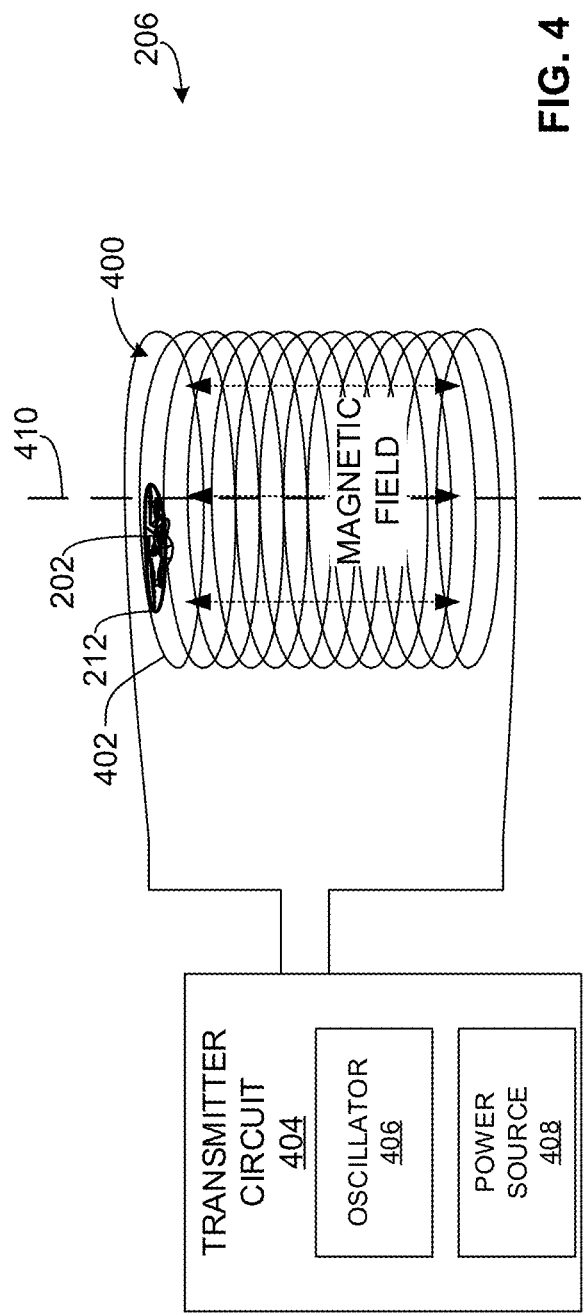

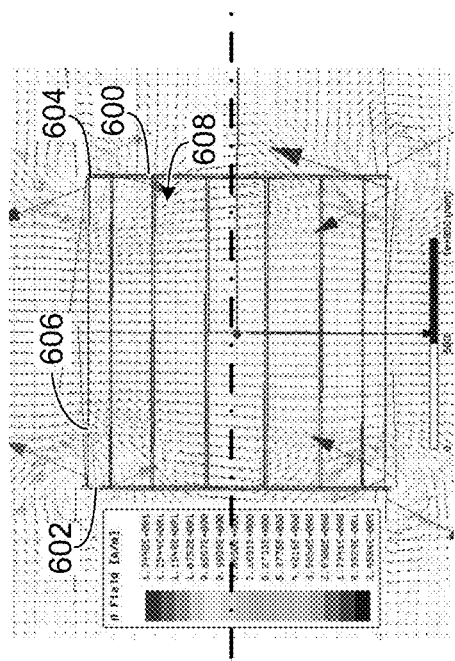
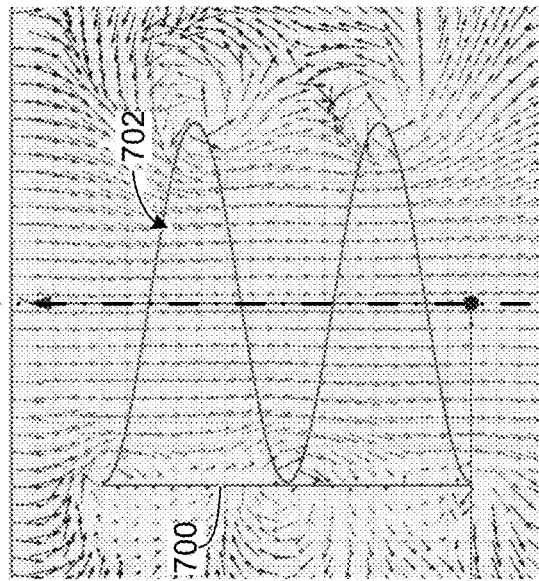
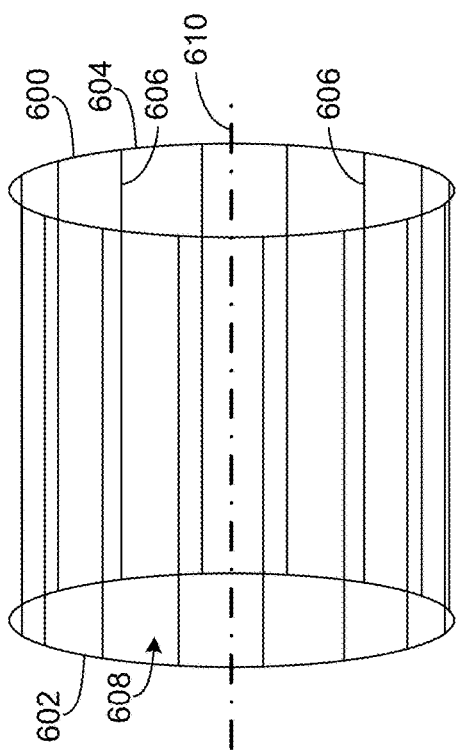
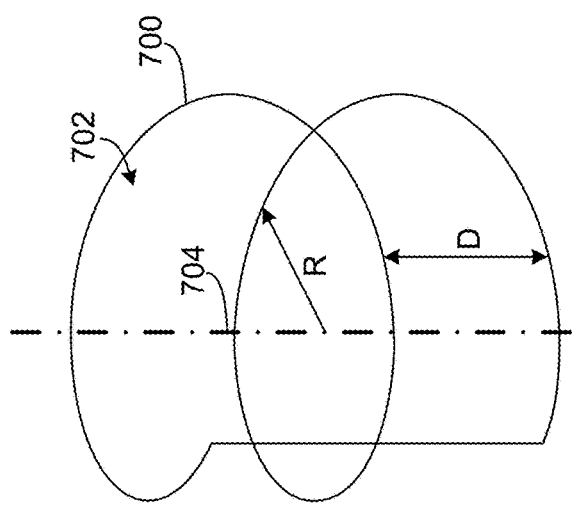

WIRELESSLY POWERED UNMANNED AERIAL VEHICLES AND TRACKS FOR PROVIDING WIRELESS POWER

FIELD OF THE DISCLOSURE

This disclosure relates generally to unmanned aerial vehicles and, more particularly, to wirelessly powered unmanned aerial vehicles and tracks for providing wireless power.

BACKGROUND

In recent years, unmanned aerial vehicles (UAVs), which are sometimes referred to as "drones," have become more readily available. In fact, sporting events such as drone racing have been extremely popular. Racers control their respective drones and fly them along a race track. In some instances, racers wear virtual reality headsets that display an image from their corresponding drone.

BRIEF DESCRIPTION OF THE DRAWINGS

FIG. 4 illustrates an example vertical track section of the example track of FIG. 2 having an example transmitter coil to provide wireless power to the example UAV.

FIG. 6A illustrates an example birdcage transmitter coil that may be implemented in the example horizontal track section of FIG. 3A, and FIG. 6B illustrates the corresponding magnetic field generated by the example birdcage transmitter coil of FIG. 6A.

FIG. 7A illustrates an example spiral transmitter coil that may be implemented in the example vertical track section of FIG. 4, and FIG. 7B illustrates the corresponding magnetic field generated by the example spiral transmitter coil of FIG. 7A.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

DETAILED DESCRIPTION

With the rise in use of unmanned aerial vehicles (UAVs) (known as "drones"), sporting activities using drones, such as drone racing or dog fighting, have gained tremendous popularity. For example, in recent years, a major television network has begun backing drone racing with some races having prices over of one million dollars. Some drone races, known as first person view (FPV) drone racing, provide a virtual reality experience. A driver or racer of a drone wears a headset with a screen (e.g., a virtual reality headset) that displays a first person view of the flying drone. The drone is equipped with a camera that transmits the video feed to the racer's headset, and the racer uses a remote control to control the drone and fly/maneuver the drone along the race course.

Figure 1:
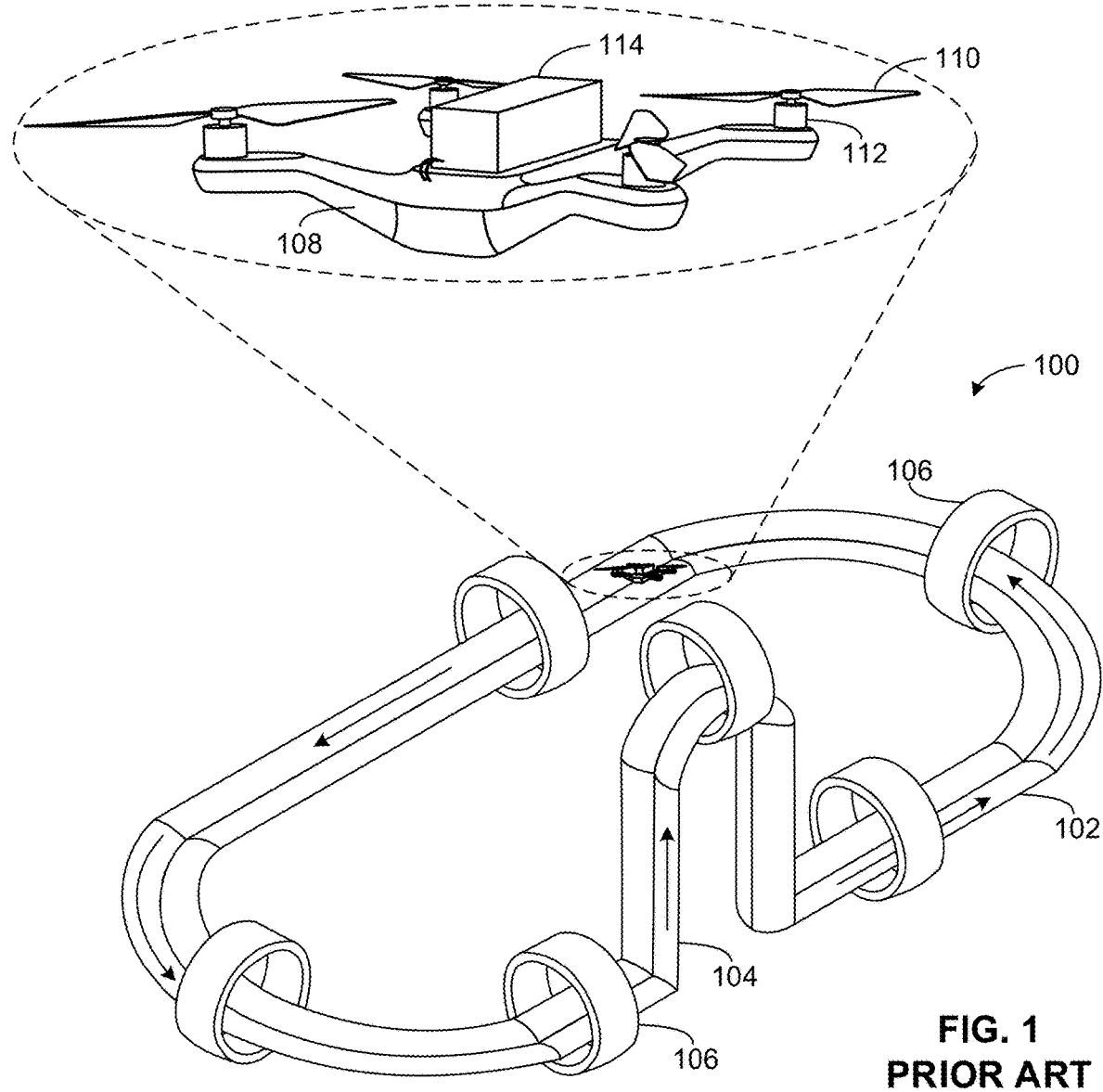
FIG. 1 shows a conventional unmanned aerial vehicle (UAV) and a conventional race track for UAVs.

FIG. 1 shows a conventional race course or race track 100 used for UAV racing. The race track 100 includes horizontal track sections (e.g., planar track section or portion), one of which is shown at reference numeral 102, vertical track sections 104, one of which is shown at reference number 104, and plurality of gates 106. A conventional UAV 108 is illustrated in the callout in FIG. 1. A driver (e.g., racer) communicates with the UAV 108 via a wireless controller. The driver controls the UAV 108 to fly over and along the horizontal and vertical track sections 102, 104. In particular, the horizontal track sections 102 define the horizontal boundaries of the race track 100. The driver flies the UAV 108 over the horizontal track sections 102 and over the vertical track sections 104. Additionally, in some races, the UAV 108 is required to fly through the gates 106, which are spaced apart at the different sections of the race track 100, and which prevent the UAV 108 from diverting too far from the race track 100 (e.g., the gates 106 limit movement in the vertical direction). In some instances, the UAV 108 is equipped with a camera that records an image in front of the UAV 108 and transmits the image to a headset or display screen for the driver. In other instances, the driver may stand near the race track and watch the UAV. Races may be performed with one UAV at a time (e.g., a time trial) or multiple UAVs at the same time.

In FIG. 1, the UAV 108 includes four rotors 110 that generate lift to propel the UAV 108 and keep the UAV 108 suspended in the air. The rotors 110 are driven by electric motors 112 (e.g., direct current (DC) motors). The UAV 108 also includes a battery 114 (or battery pack) to power the electric motors 112 and other electronics on the UAV 108. When the charge in the battery 114 is depleted, the driver must perform a pit stop to switch out the battery 114 of the UAV 108. For instance, most racing drones (such as the UAV 108) can only fly for about 10-15 minutes with a charged battery. Thus, the battery 114 severely limits the flying time of the UAV 108. Also, as can been seen in FIG. 1, the battery 114 is relatively large and also adds significant weight to the UAV 108. In most instances, the battery 114 accounts for more than a third of the overall weight of the UAV 108. Thus, the volume and weight of the battery 114 severely limit the speed and acceleration of the UAV 108. In particular, a racing drone (such as the UAV 108) can only fly about 60 miles per hour (mph).

Disclosed herein are example wirelessly powered UAVs and tracks that provide wireless power to UAVs and, thus, eliminate the need for a battery or significantly reduce the size of the battery needed in the UAVs. As a result, an example UAV can fly for an unlimited time without having to change the battery. Further, with no battery or a relatively smaller battery, the weight of the example UAV is significantly less than known UAVs. As such, example UAVs can achieve greater speeds (e.g., greater than 60 mph) and accelerations than known UAVs, which greatly improves the drone racing experience.

Example tracks disclosed herein include one or more track sections that provide wireless power through inductive coupling. In general, in inductive coupling, power is transferred between coils of wire by a magnetic field. An alternating current (AC) through a transmitter coil creates an alternating or oscillating magnetic field in accordance with Ampere's Law. The magnetic field passes through a receiver coil where it induces an alternating electromotive force (EMF) or voltage, thereby generating an AC signal in the receiver coil that may be used to drive a load (e.g., an example UAV). In other words, the two coils are inductively coupled when they are configured such that a change in current through one of the coils induces a voltage across through the coil via electromagnetic induction. As such, power is transmitted without the use of discrete human-made conductors (e.g., wires).

In some examples disclosed herein, an example track includes one or more track sections having a transmitter coil. The transmitter coil defines a passageway (or space) through which one or more UAVs can fly. The transmitter coil generates a time-varying magnetic field in the passageway. Example UAVs disclosed herein carry a receiver coil. When an example UAV is disposed inside the passageway (i.e., when the receiver coil is positioned in the alternating magnetic field), an oscillating voltage or current is induced in the receiver coil. The induced AC signal may be used to power one or more of the component(s) (e.g., the electric motor(s), the camera, etc.) of the UAV or may be rectified to a direct current (DC) signal and used to power the one or more component(s) of the UAV. In some examples, the DC signal is used to charge a battery or battery pack, which may be used at a later time to power the component(s). The example transmitter coils disclosed herein advantageously create a substantially uniform field in the three-dimensional (3D) volume defined by the transmitter coil. As such, an example UAV can receive constant and continuous power anywhere inside the passageway. For example, the UAV can travel up or down and/or side-to-side within the transmitter coil and still receive the same relative power. Further, the example transmitters coils disclosed herein can provide wireless power to multiple UAVs simultaneously.

Figure 2:
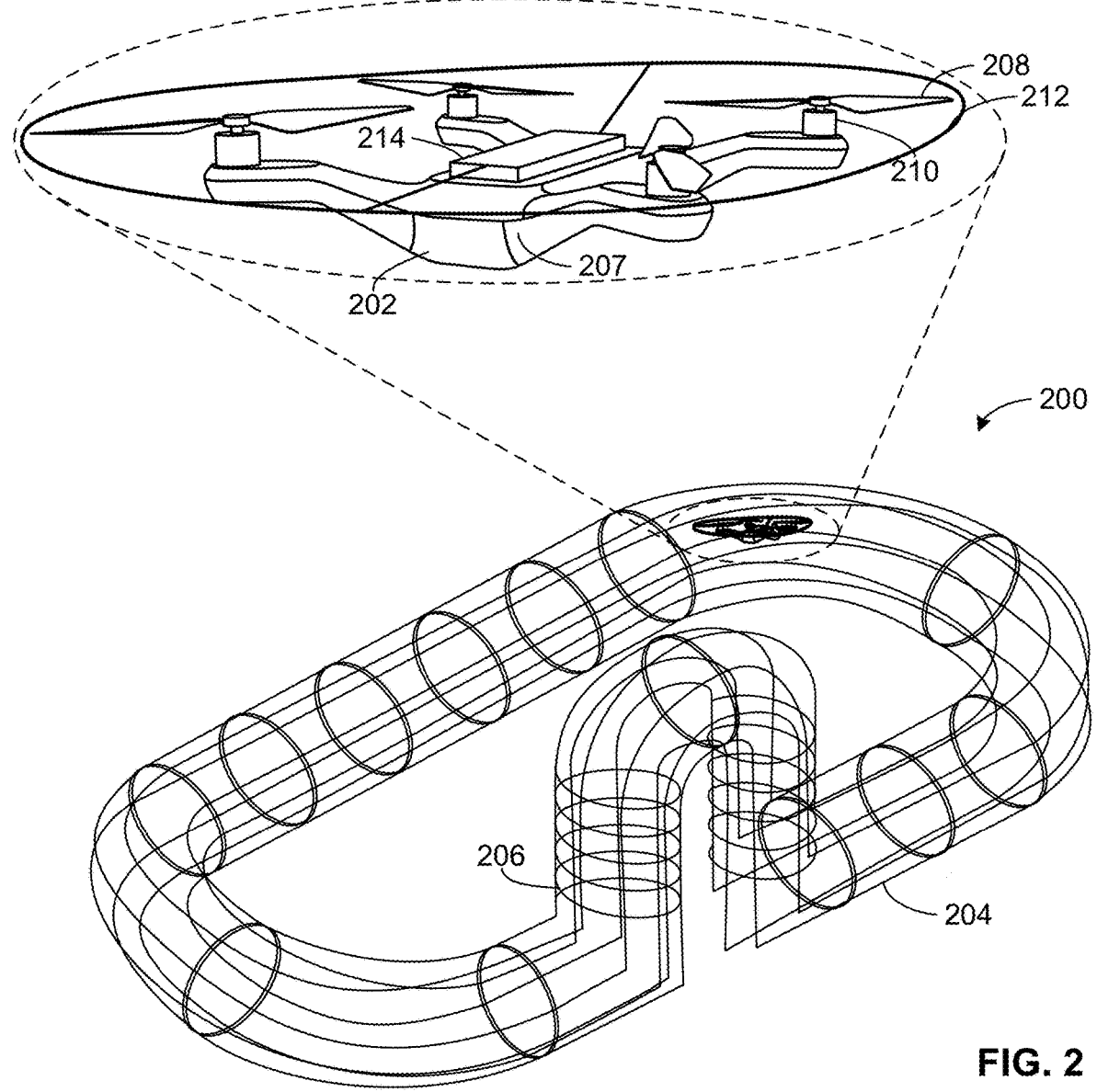
FIG. 2 illustrates an example UAV and an example track to provide wireless power to the example UAV constructed in accordance with the teachings of this disclosure.

FIG. 2 illustrates an example track 200 that provides wireless power to one or more UAVs. An example wirelessly powered UAV 202 is illustrated in the callout in FIG. 2. In the illustrated example, the track 200 includes a plurality of horizontal track sections, one of which is shown at reference numeral 204, and a plurality of vertical track sections, one of which is shown at reference numeral 206. In the illustrated example, the horizontal track sections 204 and the vertical track sections 206 are coupled in series to form a passageway (e.g., a tube) through which one or more UAVs (e.g., the UAV 202) can fly. The UAV 202 flies through the horizontal track sections 204 in a substantially horizontal direction and through the vertical track sections 206 in a substantially vertical direction (e.g., up and down). In other examples, the track 200 may include more or fewer horizontal or vertical track sections 204, 206 and/or may be arranged in other layouts or configurations.

In the illustrated example, the UAV 202 includes a body 207 and four rotors 208 (e.g., propellers). UAVs with four rotors are commonly referred to as a quad-copter. In some examples, the body 207 contains the electronics and other various component(s) of the UAV 202. The rotors 208 generate lift to propel the UAV 202 and levitated the UAV 202 in the air. In the illustrated example, the rotors 208 are driven by electric motors 210 (e.g., a brushless DC motor). In other examples, the UAV 202 may have more (e.g., six, eight, etc.) or fewer (e.g., three, one) rotors and, thus, more or fewer electric motors. Furthermore, other UAV body and/or rotor configurations may additionally or alternatively be used such as, for example, a helicopter configuration (e.g., one horizontal rotor and one vertical rotor), a fixed wing configuration, etc.

While disposed in the passageway formed by the track 200, the UAV 202 receives wireless power from the track 200. The track 200 creates an oscillating or alternating magnetic field in the passageway, as disclosed in further detail herein. In the illustrated example, the UAV 202 includes a receiver coil 212 that receives wireless power from the track 200. In particular, when the receiver coil 212 is exposed to the alternating magnetic field in the passageway, a voltage is induced in the receiver coil 212, which can be used to power the UAV 202. The receiver coil 212 may include one or more turns of wire. In some examples, only a few turns (e.g., three turns) are implemented. However, in other examples, the receiver coil 212 may include hundreds or even thousands of turns. In the illustrated example, the receiver coil 212 is ring-shaped. In the illustrated example, the receiver coil 212 is disposed outside a diameter of the rotors 208. In other words, a diameter of the receiver coil 212 is larger than a width or span of the rotors 208. In some examples, using a receiver coil that encompasses the whole UAV (or a relatively large section of the UAV) results in a higher (e.g., a maximum) Q factor and coupling between the receiver coil 212 and the transmitter coil (discussed in further detail herein). In other examples, the receiver coil 212 may be disposed in another location and/or shaped differently.

In the illustrated example, the UAV 202 has a battery 214, which may be used to store electrical power. In the illustrated example, the battery 214 is relatively small compared to batteries of known UAVs. In some examples, the current induced in the receiver coil 212 is used to charge the battery 214. However, in other examples, the UAV 202 may not have a battery. Instead, the current generated in the receiver coil 212 can be used directly to power the various component(s) of the UAV 202. While the example UAV 202 includes the receiver coil 212, the overall weight of the UAV 202 is still significantly less than the weight of known UAVs because of the elimination or reduction in size and weight of the battery 214. Thus, the example UAV 202 is capable of achieving higher speeds and accelerations than known UAVs. Further, the example UAV 202 is able to fly significantly longer (e.g., for an unlimited amount of time) than known UAVs (which need to stop every 10-15 minutes to switch out batteries).

While in the illustrated example of FIG. 2 the horizontal and vertical track sections 204, 206 form a substantially continuous passageway, in other examples there may be breaks or gaps between sections of the track 200. As such, wireless powering may only occur in certain sections or areas of the track 200. For example, the UAV 202 may receive wireless power from certain sections of the track 200 and which may be used to charge the battery 214. The battery 214 can then be used to power the UAV 202 in other sections of the track 200 that do not provide wireless power. Further, one or more sections may be used to form a space to support wireless powered dog fighting and/or sections where a UAV can wirelessly charge a battery and then resume dog fighting.

Figure 3A:
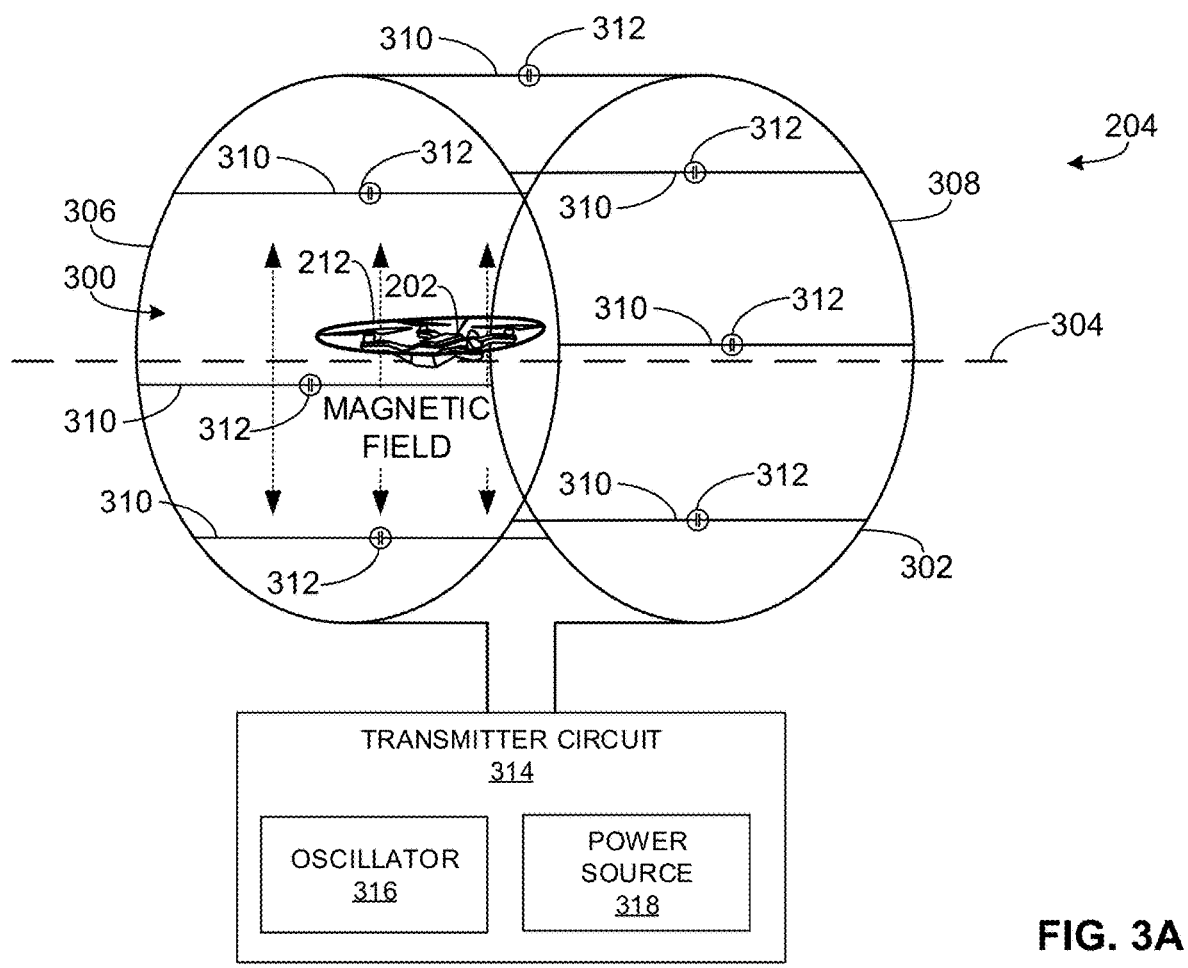
FIG. 3A illustrates an example horizontal track section of the example track of FIG. 2 having an example transmitter coil to provide wireless power to the example UAV.

FIG. 3A illustrates the example UAV 202 flying through one of the example horizontal track sections 204. In the illustrated example, the horizontal track section 204 defines a passageway 300 through which the UAV 202 can fly. When the UAV 202 is disposed within the passageway 300, the UAV 202 receives wireless power from the horizontal track section 204. As illustrated in FIG. 3A, the receiver coil 212 is disposed in a substantially horizontal orientation. In general, magnetic flux through a receiver coil is the highest (e.g., maximum) when the receiver coil is perpendicular to the magnetic flux. Thus, to provide wireless power to the UAV 202, the horizontal track section 204 generates an alternating magnetic field (represented by the vertical dotted arrows) in the vertical (up and down) direction in the passageway 300, which is perpendicular to the receiver coil 212. As such, the alternating magnetic field passes through the receiver coil 212 and induces a current.

To create the alternating magnetic field in the passageway 300, the example horizontal track section 204 includes a transmitter coil 302. In the illustrated example, the transmitter coil 302 defines the passageway 300. The transmitter coil 302 is constructed of one or more conducting elements (e.g., a copper wire). In some examples, the conducting element(s) are insulated or embedded in an insulating material (e.g., rubber, plastic, etc.), which provides rigidity to the transmitter coil 302 and/or defines the horizontal track section 204. In other examples, the horizontal track section 204 is formed by a frame or other rigid material and the transmitter coil 302 is embedded into the material and/or otherwise coupled to the material around the passageway 300.

In the illustrated example of FIG. 3A, the transmitter coil 302 is configured to generate an alternating current in a direction perpendicular to a central axis 304 of the passageway 300 defined by the transmitter coil 302. The transmitter coil 302 includes a first end ring 306 and a second end ring 308 spaced apart from each other along the central axis 304. Further, the transmitter coil 302 includes a plurality of rungs 310 (sometimes referred to as legs) between the first and second end rings 306, 308. This type of configuration is sometimes referred to as a birdcage coil. In the illustrated example, the rungs 310 are oriented substantially parallel to each other and spaced equidistant from each other around the first and second end rings 306, 308. In the illustrated example, capacitors 312 are disposed in along (e.g., in circuit with, integrated in) each of the rungs 310. In other examples, the capacitors 312 may be disposed along the first and second end rings 306, 308 between each of the rungs 310. In other examples, the capacitors 312 may be arranged in other configurations and/or additional capacitors may be utilized depending on the desired frequency characteristic.

To generate an electrical signal in the transmitter coil 302 and create an alternating magnetic field the passageway 300, the horizontal track section 204 includes a transmitter circuit 314. The transmitter circuit 314 includes an oscillator 316 (e.g., an AC generator) and a power source 318. The power source 318 may include a stored energy source (e.g., a battery or battery pack) and/or may utilize power directly from a power line (e.g., from the power grid). The oscillator 316 uses power from the power source 318 and creates an AC signal at resonant frequency in the transmitter coil 302. The configuration of the first and second end rings 306, 308, the rungs 310 and the capacitors 312 creates sinusoidal currents in each of the rungs 310 that are sequentially phase shifted around the periphery of the first and second end rings 306, 308. For example, if there are N rungs, the phase shift between the currents in neighboring runs is 360°/N. The AC creates an alternating magnetic field in a direction that is perpendicular to the central axis 304 within the spaced (3D volume) defined by the transmitter coil 302, i.e., the passageway 300. Thus, if the horizontal track section 204 (including the transmitter coil 302) is orientated substantially horizontal, the magnetic field is in the vertical direction. When the UAV 202 is disposed inside the passageway 300, the alternating magnetic field induces an alternating voltage in the receiver coil 212, which is oriented substantially perpendicular to the alternating magnetic field. In the illustrated example, the transmitter coil 302 generates a substantially constant or uniform magnetic field throughout the passageway 300. This uniform field is advantageous because the UAV 202 may receive power while flying at different elevations and/or lateral positions in the passageway 300. In other words, the UAV 202 can receive power while flying from one end to the other end of the horizontal track section 204.

In some examples, the alternating magnetic field operates a frequency of 6.78 mega-hertz (MHz). In other examples, the transmitter coil 302 may be tuned to produce an alternating magnetic field at a higher or lower frequency (e.g., 85 kilo-hertz (kHz) or 13.56 MHz). The first end ring 306 and the second end ring 308 may be coupled to or otherwise disposed adjacent the openings of upstream or downstream track sections to form a substantially continuous passageway through which the UAV 202 can fly through. In other words, a series of the horizontal track sections 204 may be arranged to form a substantially continuous passageway that can provide wireless power to the UAV 202.

While in the illustrated example the horizontal track section 204 is substantially linear or straight, in other examples the horizontal track section 204 may be curved. For example, the rungs 310 on one side may be longer than the rungs 310 on the other side, and the first and second end rings 306, 308 may not be parallel to each other. Such a configuration provides a curved passageway through which the UAV 202 can fly and still provides a substantially constant and uniform magnetic field in the passageway.

Figure 3B:
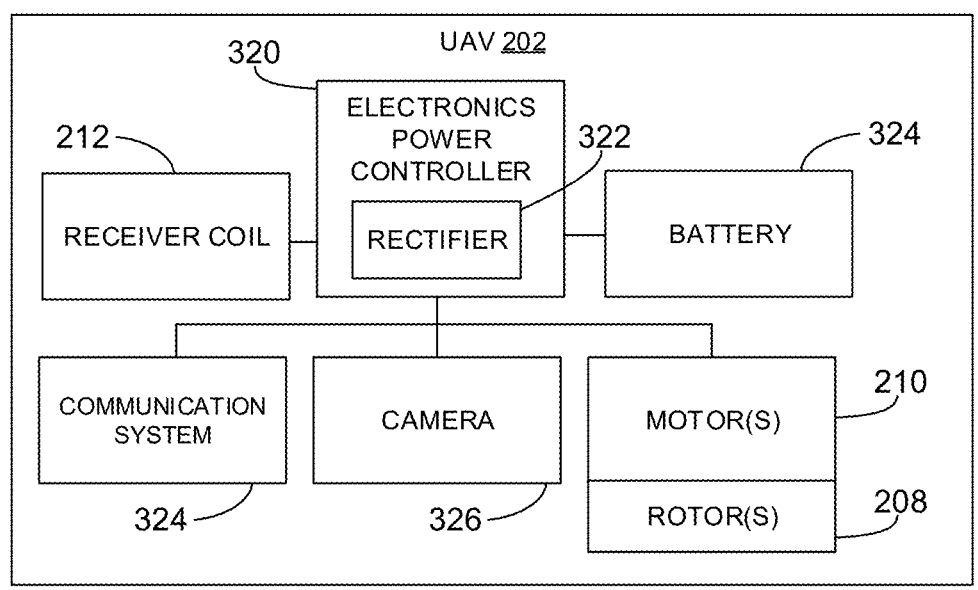
FIG. 3B is a block diagram representing an example implementation of the example UAV of FIG. 2.

FIG. 3B illustrates a block diagram representing an example implementation of the example UAV 202. The block diagram of FIG. 3B may also implement other UAVs, such as the UAVs 800, 900, 1000, 1100 disclosed in connection with FIGS. 8-11B below. In the illustrated example, the UAV 202 includes an example electronics power controller 320 (e.g., a power circuit) in circuit with the receiver coil 212. The electronics power controller 320 supplies and/or regulates the power (based on the current induced in the receiver coil 212) to the various component(s) of the UAV 202 (e.g., the electric motors 210). In some examples, the electronics power controller 320 includes a rectifier 322 (e.g., an AC to DC converter) in circuit with the receiver coil 212. The rectifier 322 converts the AC signal induced in the receiver coil 212 into a DC signal that can be used to power the various components of the UAV 202. In other examples, no rectifier may be provided. Instead, one or more of the component(s) of the UAV 202 may operate on AC power (e.g., the electric motors 210 may be AC motors). In some examples, the electronics power controller 320 includes an amplifier and/or other electronics to condition the alternating current induced in the receiver coil 212 to be used by the various component(s) of the UAV 202. The electronics power controller 320 may supply the power to the battery 214 and/or supply the power directly to the various components of the UAV 202. Thus, in some examples, the power (e.g., a DC signal) is used to charge the battery 214, which can then be used at a later time to power the UAV 202. As mentioned above, while in the illustrated example the UAV 202 includes the battery 214, in other examples no battery may be provided, and the UAV 202 may instead directly use the power received by the receiver coil 212.

In the illustrated example of FIG. 3B, the UAV 202 includes a communication system 324, which communicates with one or more external systems such as the remote controller used by the driver. The communication system 324 may include a transmitter and/or receiver (e.g., transceiver) to communicate with the driver and/or another system. In some examples, the UAV 202 includes a camera 326 that records an image of the environment in front of the UAV 202. In some examples, the recorded image is transmitted (via a transmitter of the communication system 324) to the driver to provide a live or near-live view (e.g., first person view) of the flying UAV 202. In some instances, the image is displayed on a virtual reality headset or other display screen. In the illustrated example, the example UAV 202 also includes the electric motors 210, which operate the rotors 208 to provide lift and/or directional control for the UAV 202. The example electric motors 210 are DC electric motors. In other examples, other types of motors (e.g., an AC motor) may be implemented. The power received by the receiver coil 212 is used to power the communication system 324, power the camera 326, power the electric motors 210, charge the battery 214 and/or provide power to any other electrical component or system (e.g., a guidance system, a light, etc.).

While only one UAV is depicted in FIG. 3A, the horizontal track section 204 may accommodate more than one UAV and provide equal and constant power to all of the UAVs in the passageway 300. Below is an example calculation illustrating an amount of power needed by the horizontal track section 204 to provide constant power to multiple UAVs. Assume the passageway 300 is 1.5 meters (m) in diameter (e.g., the first and second end rings 306, 308 are 1.5 m in diameter). Also assume the capacitors 312 have a capacitance of 9.5 pico-farad (pF). With this configuration, the transmitter coil 302 can achieve a series resonance at 6.78 Mhz. Also assume the receiver coil 212 on the UAV 202 is a 5-turn solenoid coil with a radius of 12.5 centimeters (cm), which allows the passageway 300 to accommodate a total of six UAVs side-by-side (e.g., each receiver coil is 25 cm in diameter so six receiver coils can fit within the 1.5 m passageway 300). In this example, the mutual coupling between the transmitter coil 302 and the receiver coil 212 is 4.14 ohms. The receiver coil 212 has an area $A=\pi r^2=0.049$ m$^2$. Suppose the rotors 208 occupy the majority area inside the receiver coil 212. In a relatively short time duration $\Delta t$, a total volume of air, represented by $A \times v \times \Delta t$, where v is velocity, is pushed by the rotors 208. Thus, the total kinetic energy provided by the UAV 202 gained by the air in duration $\Delta t$ is given by Equation 1 below.

$$P_{min} \times \Delta t = \tfrac{1}{2} \times v^3 \times A \times \rho \times \Delta t \qquad \text{Equation 1}$$

In Equation 1, $\rho$ is the mass density of air and $P_{min}$ is the minimum power need for the UAV 202 to hover. The total momentum p gained by the air in time duration $\Delta t$ is given by Equation 2 below.

$$p = v^2 \times A \times \rho \times \Delta t \qquad \text{Equation 2}$$

The counterforce provided by the air to the UAV 202 is given by Equation 3 below.

$$F \times \Delta t = p \qquad \text{Equation 3}$$

In Equation 3, F is the force balancing the weight of the UAV 202. In particular, F=mg, where m is the mass of the UAV 202 and g is the force of gravity. Then, the minimum power $P_{min}$ can be found using Equation 4 below, which is a combination of Equations 1, 2 and 3.

$$P_{min} = \frac{1}{\sqrt[4]{\rho A}} (2mg)^{3/2} \qquad \text{Equation 4}$$

Assume, for example, the mass density $\rho$ is 1.2 kg/m$^3$, the mass m of the UAV 202 is 500 grams (g), and gravity g is 9.8 Netwons/kilogram (N/kg), then the minimum power $P_{min}$ required for the UAV 202 to hover is 31.6 Watts (W). Assuming the resistance of the receiver coil 212 is about 0.9 ohm, then to deliver 31.6 W at 95% receiver coil efficiency, the receiver voltage needed is about 24V, which corresponds to a transmitter coil input current of 5.8 A. Thus, the field that is required to deliver this power is about 2.4 ampere per meter (A/m) inside the transmitter coil 302. Thus, the total power needed to generate such an alternating magnetic field is not only practical, but relatively small compared to other power demands of other wireless power devices.

FIG. 4 shows the example UAV 202 flying through one of the example vertical track sections 206. Similar to the horizontal track section 204, the vertical track section 206 defines a passageway 400 through which the UAV 202 can fly. When the UAV 202 is disposed within the passageway 400, the UAV 202 receives wireless power from the vertical track section 206. In particular, the vertical track section 206 generates an alternating magnetic field (represented by the vertical dotted arrows) in the vertical (up and down) direction in the passageway 400, which is perpendicular to the receiver coil 212. Thus, as the UAV 202 travels up or down in the passageway 400, the alternating magnetic field passes through the receiver coil 212 and induces a current.

To create the alternating magnetic field in the passageway 400, the example vertical track section 206 includes a transmitter coil 402. In the illustrated example, the transmitter coil 402 is in the shape of a spiral (having a plurality of turns) that defines the passageway 400. The transmitter coil 402 is constructed of one or more conducting elements (e.g., a copper wire). In some examples, the conducting element(s) are insulated or embedded in an insulating material (e.g., rubber, plastic, etc.), which provides rigidity to the transmitter coil 402 and/or defines the vertical track section 206. In other examples, the vertical track section 206 is formed by a frame or other rigid material and the transmitter coil 402 is embedded into the material and/or otherwise coupled to the material around the passageway 400.

Similar to the horizontal track section 204 in FIG. 3A, the vertical track section 206 of FIG. 4 includes a transmitter circuit 404 to generate an alternating current in the transmitter coil 402, thereby generating an alternating magnetic field in the passageway 400. In particular, the transmitter circuit 404 includes an oscillator 406 and a power source 408. In some examples, the powers source 318 (FIG. 3A) used to power the horizontal track section 204 is the same as the power source 408 used to power the vertical track section 206. In the illustrated example, the oscillator 406 generates an AC signal in the transmitter coil 402, which generates an alternating magnetic field in a direction aligned with a central axis 410 of the passageway 400 defined by the transmitter coil 402. As such, when the UAV 202 moves vertically up or down through the passageway 400, the receiver coil 212 is oriented perpendicular to the alternating magnetic field. The alternating magnetic field passes through the receiver coil 212, thereby inducing an alternating current in the receiver coil. While in the illustrated example the transmitter coil 402 is substantially linear or straight, in other examples the passageway 400 may be curved. In such an example, the transmitter coil 402 still generates an alternating magnetic field in a direction substantially parallel to a central axis through the transmitter coil 402. In other examples, other types of coils may be implemented as the transmitter coil 402 to generate an alternating magnetic field such as a Maxwell coil or a Helmholtz coil.

Thus, as can been in FIGS. 2-4, the UAV 202 can receive power from the track 200 while flying through the horizontal and vertical track sections 204, 206, which generate an alternating magnetic field in the vertical direction and, thus, perpendicular to the horizontal orientation of the receiver coil 212. The horizontal and vertical track sections 204, 206 may be any length depending on the design of the track. In some examples, each of the horizontal and vertical track sections 204, 206 of the track 200 may include a separate transmitter circuit (e.g., the transmitter circuit 314 (FIG. 3A), the transmitter circuit 404 (FIG. 4)). In other examples, multiple sections of the track 200 may be controlled by a common transmitter circuit, which generates an alternating current in each of the sections and/or uses the same power source.

In some examples, instead of using the transmitter coil 302 (FIG. 3A) having the birdcage configuration for the horizontal track section 204, the horizontal track section 204 may include a spiral transmitter coil, similar to the transmitter coil 402 of FIG. 4, which creates an alternating magnetic field in in a direction parallel to a central axis of the transmitter coil. In such an example, the receiver coil 212 of the UAV 202 may be oriented in a substantially vertical direction, such that the alternating magnetic field (in the horizontal direction) is transmitted through the receiver coil 212. Likewise, instead of using the transmitter coil 402 having a spiral shape for the vertical track section 206, the vertical track section 206 may include a birdcage coil, similar to the transmitter coil 302 of FIG. 3A, which creates an alternating magnetic field in a direction perpendicular to a central axis of the transmitter coil. Thus, with the receiver coil 212 oriented substantially vertical, the horizontal alternating magnetic field passes through the receiver coil 212.

Figure 5:
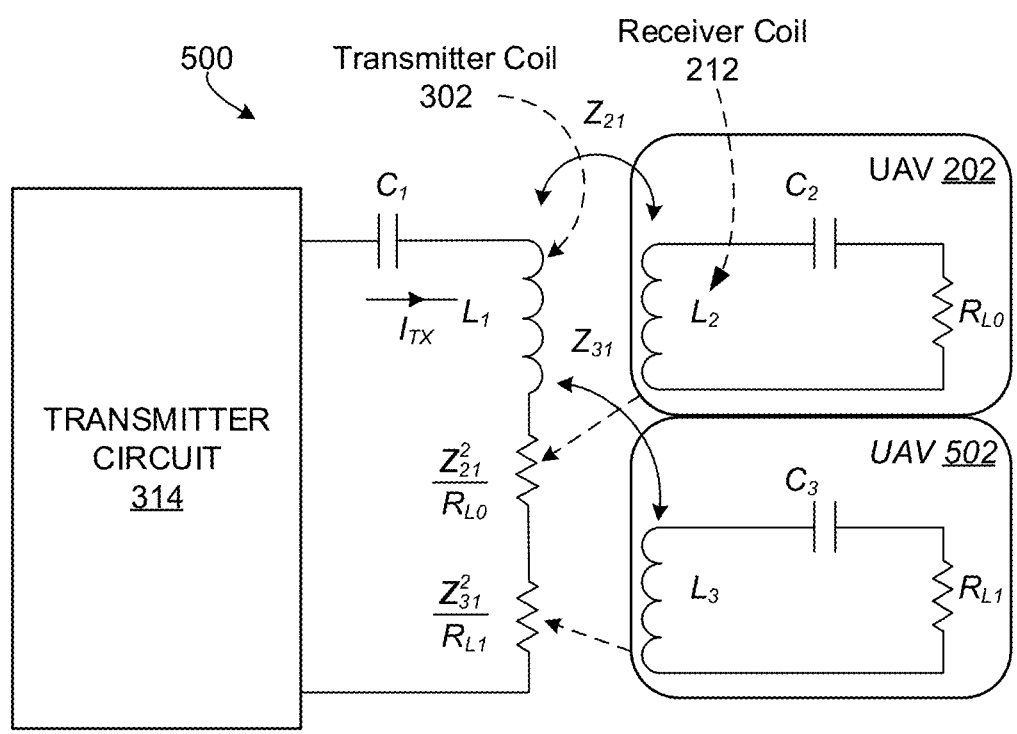
FIG. 5 illustrates an example circuit representing the inductive coupling between the example UAV and the example track of FIG. 2.

FIG. 5 depicts a circuit representation of the power transfer between the track 200 and one or more UAVs (e.g., the UAV 202). In particular, FIG. 5 illustrates a transmitter circuit 500 representing the power transfer between the transmitter coil 302 of one of the horizontal track sections 204 and one or more UAVs. However, the circuit representation may also be applied to other ones of the transmitter coils implemented in the track 200 of FIG. 2, such as the transmitter coil 402 of FIG. 4.

In the illustrated example of FIG. 5, the transmitter coil 302 (represented by coil ($L_1$)) is series tuned to resonance at operating frequency co (e.g., 6.78 MHz). For example, the transmitter circuit 314 (e.g., via the oscillator 316 (FIG. 3A)) generates an AC signal in the transmitter coil 302. The UAV 202 includes the receiver coil 212 (represented by coil $L_2$). For example, the series resonance in the transmitter circuit 500 and the UAV 202 are given using Equations 5 and 6 below.

$$j\omega L_1 + \frac{1}{j\omega C_1} = 0 \qquad \text{Equation 5}$$

$$j\omega L_2 + \frac{1}{j\omega C_2} = 0 \qquad \text{Equation 6}$$

In Equation 5, $C_1$ represents the capacitor in the transmitter circuit 500, and in Equation 6, $C_2$ represents the capacitor in the circuit representing the UAV 202. As shown in Equation 5, the impedance of the transmitter coil 302 (represented by $j\omega L_1$) is equal or balanced with the negative impedance of the capacitor $C_1$ (represented by $1/j\omega C_1$) in the transmitter circuit 500. Likewise, as shown in Equation 6, the impedance of the receiver 212 (represented by $j\omega L_2$) is equal or balanced with the negative impedance of the capacitor $C_2$ (represented by $1/j\omega C_2$) in the circuit representing the UAV 202.

When the UAV 202 is disposed in the alternating magnetic field generated by the transmitter coil 302, an inductive coupling is established between the transmitter coil 302 ($L_1$) and the receiver coil 212 ($L_2$) (represented by mutual impedance $Z_{21}$), and the equivalent load $R_{L0}$ of the UAV 202 (e.g., the motors 210, the camera 326, etc.) is reflected to the transmitter circuit 500 as a series resistance $Z_{21}^2/R_{L0}$. This relationship ensures that as the power demand of the UAV 202 increases (e.g., when the UAV 202 accelerates or rises vertically), the equivalent load $R_{L0}$ reduces and, thus, the reflected impedance to the transmitter circuit 500 would increase. As long as the transmitter circuit 500 is able to provide a constant AC (represented by $I_{TX}$), the power ($P_2$) provided by the transmitter circuit 500 to the UAV 202 increases. In other words, the transmitter coil 302 is able to supply proper power to the UAV 202 as it demands, without need of a control loop or side band communication.

In some examples, multiple UAVs may draw power from the transmitter coil 302. A second UAV 502 is illustrated in FIG. 5. Similar to the UAV 202 (the first UAV 202), the second UAV 502 includes a receiver coil (represented by $L_2$). When the receiver coil $L_2$ of the second UAV 502 is disposed in the alternating magnetic field of the transmitter coil 302, the receiver coil $L_2$ couples to the transmitter coil 302 and its power demand is reflected to the transmitter circuit 500 as a series resistance $Z_{31}^2/R_{L1}$. As long as the transmitter circuit 314 maintains a constant AC ($I_{TX}$), the second UAV 500 can receive power ($P_3$) from the transmitter coil 302 without impacting the power ($P_2$) delivered to the first UAV 202, and vice versa. Thus, multiple UAVs may receive power from the transmitter coil 302 without affect the power deliver to the other UAVs. The power ($P_2$)

delivered to the UAV 202 and the power (P$_3$) delivered to the second UAV 502 are provided by Equations 7 and 8 below, respectively.

$$P_2 = I_{TX}^2 \frac{Z_{21}^2}{R_L} \quad \text{Equation 7}$$

$$P_3 = I_{TX}^2 \frac{Z_{31}^2}{R_L} \quad \text{Equation 8}$$

Example techniques to provide constant current behavior power amplifier are disclosed in U.S. application Ser. No. 14/861,931, titled "Constant Current Radio Frequency Generator for a Wireless Charging System," and filed Sep. 22, 2015, which is hereby incorporated by reference in its entirety. The example techniques disclosed in the above-referenced application can be used to provide constant AC to the transmitter circuit 500, for example, and, thus, provide power to one or more UAVs.

FIG. 6A illustrates an example birdcage transmitter coil 600, and FIG. 6B illustrates the magnetic field (in A/m) generated in and around the birdcage transmitter coil 600 of FIG. 6A. The example birdcage transmitter coil 600 may correspond to, for example, the example transmitter coil 302 (FIG. 3A), which may be implemented in one or more of the example horizontal or vertical track sections 204, 206. Similar to the transmitter coil 302 of FIG. 3A, the example birdcage transmitter coil 600 includes a first end ring 602, a second end ring 604 and a plurality of rungs 606 between the first and second end rings 602, 604. The birdcage transmitter coil 600 defines a passageway 608 having a central axis 610. As illustrated in FIG. 6B, the birdcage transmitter coil 600 creates a relatively uniform magnetic field in the passageway 608 defined by the rungs 606 and between the first and second end rings 602, 604. In particular, the magnetic field is perpendicular to the central axis 610 (e.g., a horizontal axis or plane) of the birdcage transmitter coil 600. If the birdcage transmitter coil 600 is orientated horizontally, for example, the magnetic field in the passageway 608 is in the vertical direction. In FIG. 6B, the magnetic field lines spiral around the first and second end rings 602, 604. However, when additional birdcage transmitter coils are disposed upstream and downstream (on the left and right in FIGS. 6A and 6B) of the birdcage transmitter coil 600, the spiral field lines are eliminated and only the vertical magnetic field lines are present.

FIG. 7A illustrates an example spiral transmitter coil 700, and FIG. 7B illustrates the magnetic field generated in and around the spiral transmitter coil 700 of FIG. 7B. The example spiral transmitter coil 700 may correspond to, for example, the example transmitter coil 402 (FIG. 4), which may be implemented in one or more of the example horizontal or vertical track sections 204, 206. In the illustrated example, the spiral transmitter coil 700 defines a passageway 702 having a central axis 704. As illustrated in FIG. 7B, the spiral transmitter coil 700 creates a relatively constant magnetic field in the passageway 702, which is parallel to or aligned with the central axis 704 of the spiral transmitter coil 700. In the illustrated example, the spiral transmitter coil 700 includes two loops or turns. However, in other examples, the spiral transmitter coil 700 may include more (e.g., three, five, ten, etc.) or fewer (e.g., one) turns. In the illustrated example, the turns of the spiral transmitter coil 700 are separated by distance D. Further, in the illustrated example, the spiral transmitter coil 700 has a radius R. In some examples, the radius R is 0.75 m. However, in other examples, the radius R may be larger or smaller depending on the desired size of the passageway through the spiral transmitter coil 700.

Figure 8:
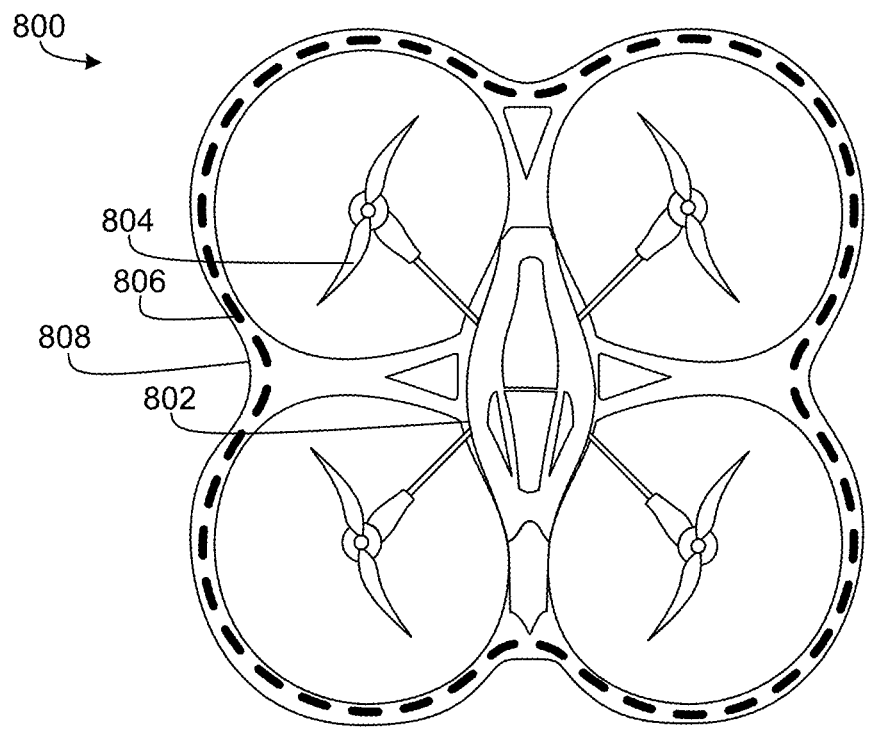
FIG. 8 is a top view of an example UAV having an example receiver coil disposed around the diameters of example rotors of the example UAV for receiving wireless power.
Figure 9:
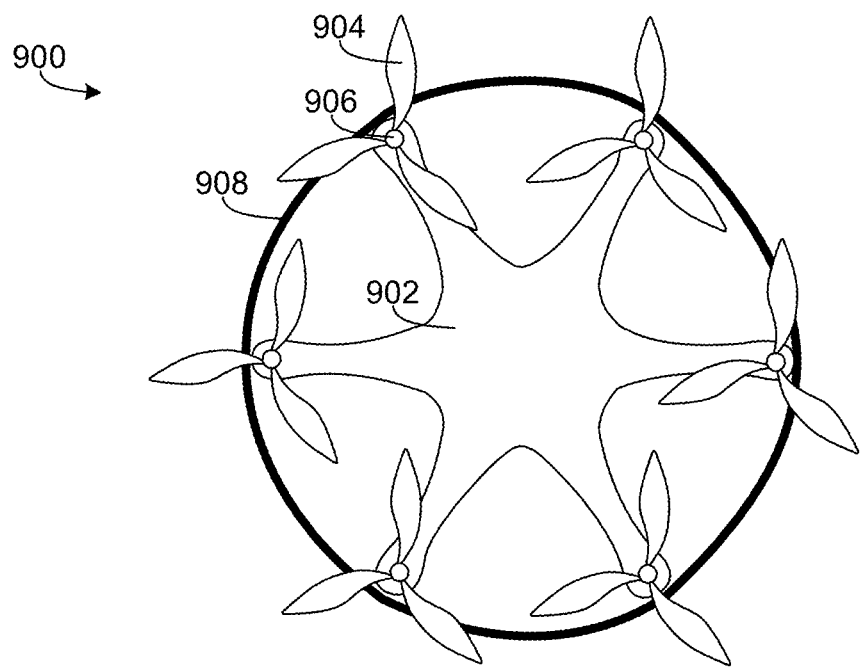
FIG. 9 is a top view an example UAV having an example receiver coil disposed around example motors and inside the diameters of example rotors of the example UAV for receiving wireless power.

While in the illustrated example of FIGS. 2-4 the receiver coil 212 is disposed around the rotors 208 of the UAV 202, in other examples the receiver coil 212 can be shaped differently and/or disposed in other locations. For example, FIGS. 8 and 9 illustrate example UAVs having different receiver coil configurations and which may be used to receive power from the track 200, similar to the UAV 202 disclosed herein. FIG. 8 illustrates an example UAV 800 having a body 802, four rotors 804 and a protective frame 806 around an outer diameter the rotors 804. In other examples, the UAV 800 may have more (e.g., six, eight, etc.) or fewer (e.g., three, one) rotors. In the illustrated example, the UAV 800 includes a receiver coil 808 that is embedded or integrated into the protective frame 806. Thus, the receiver coil 808 is disposed outside of a diameter of the rotors 804. In other examples, the receiver coil 808 may be carried on a top or a bottom of the protective frame 806. Similar to the UAV 202 disclosed in connection with FIGS. 2-4, when the receiver coil 808 is in the presence of an alternating magnetic field, a current is induced in the receiver coil 808, which may be used to power the various component(s) of the UAV 800.

FIG. 9 illustrates another example UAV 900. In the illustrated example, the UAV 900 has a body 902 and six rotors 904 operated by respective motors 906. In other examples, the UAV 900 may have more (e.g., eight, ten, etc.) or fewer (e.g., four, two, etc.) rotors. The example UAV 900 includes a receiver coil 908. In the illustrated example, the receiver coil 908 is disposed around the motors 906 but within an outer diameter of the rotors 904. In other examples, the receiver coils 808, 908 of the UAVs 800, 900 may be disposed in other locations and/or shaped differently (e.g., having a larger or smaller radius).

Figure 10:
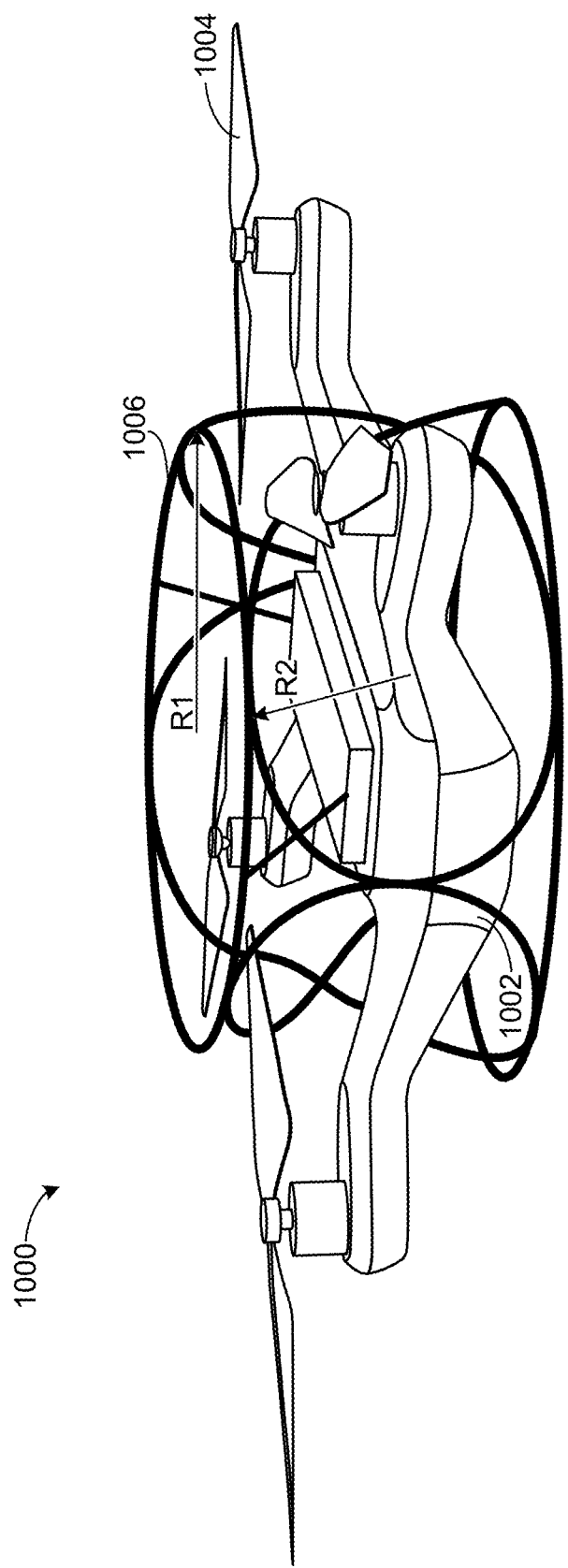
FIG. 10 illustrates an example UAV having an example 3D form receiver coil capable of receiving wireless power in more than one direction.
Figure 11A:
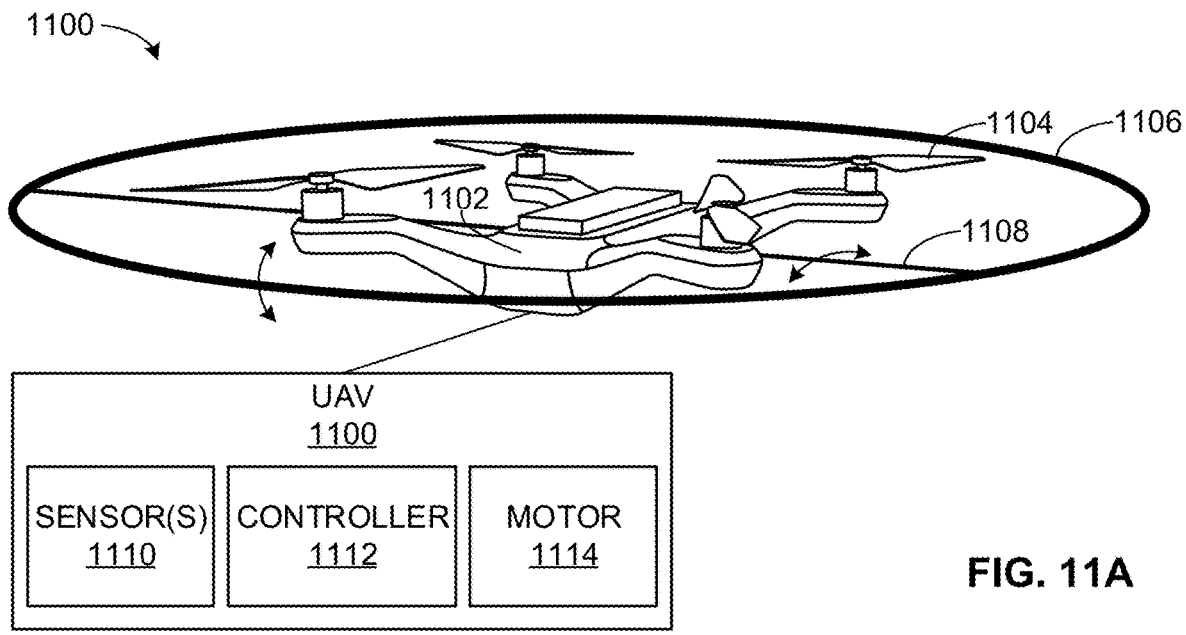
FIG. 11A illustrates an example UAV having an example receiver coil in a first orientation and which can be tilted to receive wireless power in more than one direction.
Figure 11B:
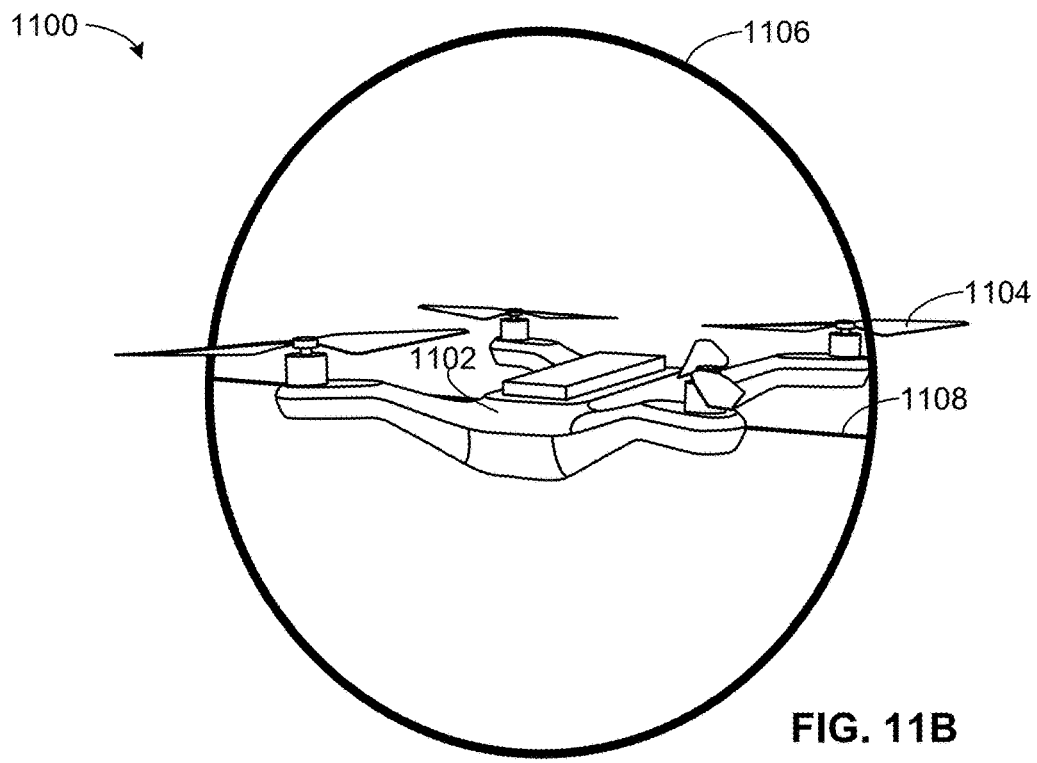
FIG. 11B illustrates the example UAV of FIG. 11A with the example receiver coil in a second orientation.

FIGS. 10, 11A and 11B illustrate example UAVs having receiver coils capable of capturing magnetic flux in more than one direction relative to the UAV. The UAVs of FIGS. 10 and 11 may receive power from the track 200, similar to the UAV 202 disclosed herein. FIG. 10 illustrates an example UAV 1000 having a body 1002 and four rotors 1004. In other examples, the UAV 1000 may have more (e.g., six, eight, etc.) or fewer (e.g., three, one) rotors. In the illustrated example, the UAV 1000 includes a 3D form receiver coil 1006. The 3D form receiver coil 1006 extends in directions in all three dimensions. In particular, the 3D form receiver coil 1006 forms loops that face different directions, which ensures capturing of the magnetic flux from different directions as the UAV 1000 flies. In some examples, the receiver coil 1006 is formed of a single coil element (e.g., a single wire). In other examples, discrete or separate coil elements (e.g., multiple wires) may be utilized. In some examples, the loops of the 3D form receiver coil 1006 have different radii. For example, one radius R1 of a loop formed in the 3D form receiver coil 1006 may be larger than another radius R2 of another loop formed in the 3D form receiver coil 1006. In other examples, all of the loops of the 3D form receiver coil 1006 may have the same or substantially the same radius.

FIGS. 11A and 11B illustrate another example UAV 1100. The UAV 1100 includes a body 1102 and four rotors 1104. In other examples, the UAV 1100 may have more (e.g., six, eight, etc.) or fewer (e.g., three, one) rotors. In the illustrated example, the UAV 1100 includes a receiver coil 1106. The example UAV 1100 may correspond to the UAV 202 disclosed in FIG. 3B. To enable the receiver coil 1106 to capture magnetic fields in different directions, the receiver coil 1106 is movable relative to the body 1102. For example, the receiver coil 1106 is coupled to an axle 1108 that rotates (e.g., pivots) to tilt the receiver coil 1106. In the illustrated example, the axle 1108 extends through the body 1102. The axle 1108 may be rotated to tilt or turn the receiver coil 1106 relative to the body 1102. For example, in the illustrated example of FIG. 11A, the receiver coil 1106 is orientated substantially horizontal and, thus, may be used in a vertical magnetic field to receive power. If the magnetic field is in the horizontal direction, the axle 1108 may be rotated to turn the receiver coil 1106 to a substantially vertical orientation, as illustrated in FIG. 11B. Thus, the receiver coil 1106 can capture a magnetic field in different directions.

In some examples, the receiver coil 1106 may be oriented to receive an alternating magnetic field in the direction of travel. For example, assume one or more spiral transmitter coils (e.g., the transmitter coil 402 and/or the spiral transmitter coil 700) are implemented in the horizontal and vertical track sections of a race track. In such an example, the magnetic fields are in the direction of the passageway and, thus, in the direction of travel through the transmitter coils. Therefore, in the horizontal track sections (where the magnetic field is horizontal), the receiver coil 1106 can be titled to the vertical orientation illustrated in FIG. 11B, and in the vertical track sections (where the magnetic field is vertical), the receiver coil 1106 can be tilted to the horizontal orientation illustrated in FIG. 11A. FIG. 11A shows an example block representation of the example UAV 1100. To determine a direction of travel of the UAV 1100, the UAV 1100 includes one or more sensor(s) 1110. The sensor(s) 1110 may include accelerometers, gyroscopes, etc. Based on the direction of travel (as detected or sensed by the sensors 1110), a controller 1112 controls a motor 1114 to rotate the axle 1108 and, thus, tilt the receiver coil 1106. The controller 1112 may be implemented in the example electronics power controller 320 of FIG. 3B. The motor 1114 may be disposed in the body 1102 of the UAV 1100, for example.

Additionally, the receiver coil 1106 can be titled to any other angle between the fully vertical and horizontal orientations. Thus, the receiver coil 1106 can be used to capture power when the magnetic field is not entirely vertical or horizontal. For example, if the UAV 1100 is flying through a spiral transmitter coil that is oriented 20° relative to horizontal, the axle 1108 can be rotated to position the receiver coil 1106 at 20°, such that the receiver coil 1106 remains perpendicular to the magnetic field generated in the spiral transmitter coil.

While the example transmitter coils 302, 402, 600, 700 disclosed herein are described in connection with a race track for UAVs, the example transmitter coils 302, 402, 600, 700 can be used in other applications to provide wireless power to one or more UAV(s). For example, a network of UAVs may be configured (or controlled) to fly around an office or school as transportation/delivery tools and/or personal UAV assistants. One or more transmitter coils (e.g., the transmitter coil 302, the transmitter coil 402, etc.) can be integrated into the hallways of the building to provide wireless power to the UAVs, thereby eliminating or reducing the need for batteries. As such, the weight of the UAV is drastically reduced, which increases the overall efficiency of the UAV. Further, the UAVs can fly longer by not having to switch out batteries and/or recharge. Thus, the UAVs can accomplish more tasks within a given time.

Further, with the use of wireless power, another aspect can be added to UAV games and sports. For example, the magnetic field distribution of the different transmitters (e.g., different track sections) can be reconfigured dynamically during a race (e.g., by an organizer of the race or a player) to create a dynamic obstacle course. This would allow players to sabotage each other by controlling the field distribution of certain sections, which adds another element (and, thus, strategy) to the race, thereby creating a more complex and interesting game.

While the example methods, apparatus/systems and articles of manufacture disclosed herein for wirelessly powering a vehicle are described in connection with unmanned aerial vehicles, the disclosed examples may similarly be implemented for manned aerial vehicles and/or other vehicles such as cars, boats, etc. For example, one or more track sections having transmitter coils may be disposed around a track or road for cars. The cars may carry receiver coils, similar to the UAVs disclosed herein and, thus, receiver wireless power as disclosed herein.

While example manners of implementing the UAVs 202, 800, 900, 1000, 1100 are illustrated in FIGS. 2-5 and 8-11B, one or more of the elements, processes and/or devices illustrated in FIGS. 2-5 and 8-11B may be combined, divided, re-arranged, omitted, eliminated and/or implemented in any other way. Further, the example motor(s) 210 (which may correspond to any of the example motors of the example UAVs 800, 900, 1000, 1110), the example receiver coil 212 (which may correspond to any of the example receiver coils 806, 906, 1006, 1106 of the example UAVs 800, 900, 1000, 1110), the example battery 214, the example electronics power controller 320, the example rectifier 322, the example communication system 324, the example camera 326, the example sensor(s) 1110, the example controller 1112, the example motor 1114 and/or, more generally, the example UAVs 202, 800, 900, 1000, 1100 of FIGS. 2-5 and 8-11B may be implemented by hardware, software, firmware and/or any combination of hardware, software and/or firmware. Thus, for example, any of the example motor(s) 210 (which may correspond to any of the example motors of the example UAVs 800, 900, 1000, 1110), the example receiver coil 212 (which may correspond to any of the example receiver coils 806, 906, 1006, 1106 of the example UAVs 800, 900, 1000, 1110), the example battery 214, the example electronics power controller 320, the example rectifier 322, the example communication system 324, the example camera 326, the example sensor(s) 1110, the example controller 1112, the example motor 1114 and/or, more generally, the example UAVs 202, 800, 900, 1000, 1100 of FIGS. 2-5 and 8-11B could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example motor(s) 210 (which may correspond to any of the example motors of the example UAVs 800, 900, 1000, 1110), the example receiver coil 212 (which may correspond to any of the example receiver coils 806, 906, 1006, 1106 of the example UAVs 800, 900, 1000, 1110), the example battery 214, the example electronics power controller 320, the example rectifier 322, the example communication system 324, the example camera 326, the example sensor(s) 1110, the example controller 1112 and/or the example motor 1114 is/are hereby expressly defined to include a tangible computer readable storage device or storage disk such as a memory, a digital versatile disk (DVD), a compact disk (CD), a Blu-ray disk, etc. storing the software and/or firmware. Further still, the example UAVs 202, 800, 900, 1000, 1100 of FIGS. 2-5 and 8-11B may include one or more elements, processes and/or devices in addition to, or instead of, those illustrated in FIGS. 2-5 and 8-11B and/or may include more than one of any or all of the illustrated elements, processes and devices.

Figure 12:
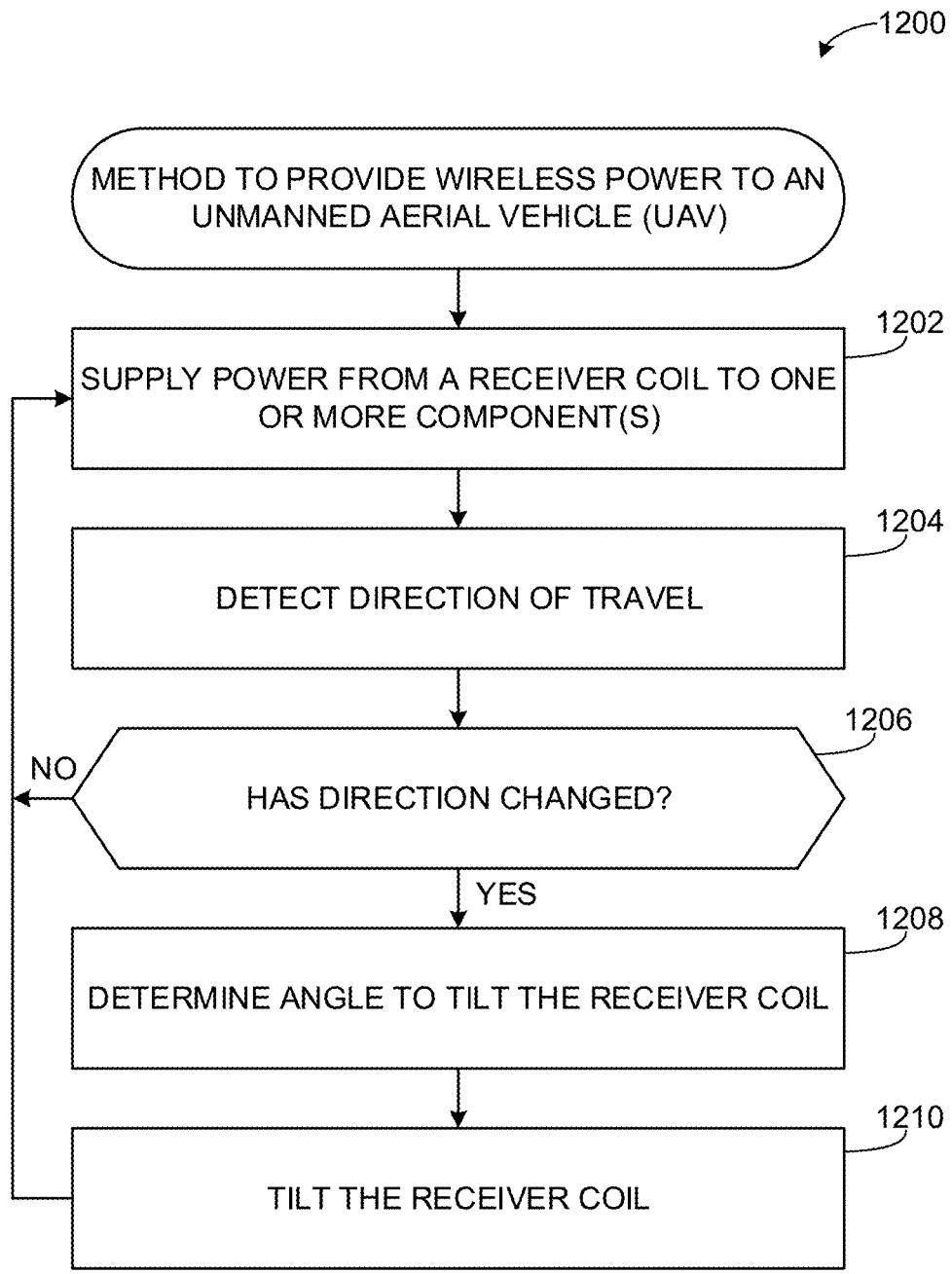
FIG. 12 is a flowchart representative of example method, that may be implemented at least in part by machine readable instructions, as implemented by the example UAV of FIGS. 11A and 11B and, at least in part, by the example UAVs of FIGS. 2, 8, 9 and 10.

A flowchart representative of example machine readable instructions for implementing the example UAV 1100 of FIGS. 11A and 11B (and, at least in part, the example UAVS 202, 800, 900, 1000 of FIGS. 3B, 8, 9 and 10) is shown in FIG. 12. In this example, the machine readable instructions comprise a program for execution by a processor such as the processor 1312 shown in the example processor platform 1300 discussed below in connection with FIG. 13. The program may be embodied in software stored on a tangible computer readable storage medium such as a CD-ROM, a floppy disk, a hard drive, a digital versatile disk (DVD), a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowchart illustrated in FIG. 12, many other methods of implementing the example UAV 1100 of FIGS. 11A and 11B (and, at least in part, the example UAVS 202, 800, 900, 1000 of FIGS. 3B, 8, 9 and 10) may alternatively be used. For example, the order of execution of the blocks may be changed, and/or some of the blocks described may be changed, eliminated, or combined.

As mentioned above, the example process of FIG. 12 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIG. 12 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 12 is a flowchart representing an example method 1200 that may be implemented by the example UAV 1100 of FIGS. 11A and 11B to wirelessly power a UAV. The example method 1200 may also be implemented, at least in part, by any of the example UAVs 202, 800, 900, 1000 of FIGS. 3B, 8, 9 and 10. At block 1202, the electronics power controller 320 (FIG. 3B) receives the power from the signal generated in the receiver coil 1106 and supplies the power to one or more of the components of the UAV 1100. In some examples, the AC signal induced in the receiver coil 1106 is rectified (via the rectifier 322) to a DC signal. In other examples, one or more of the components of the UAV 1100 operate via AC and, thus, the electronics power control 320 regulates the AC power to the component(s). In some examples, power from the receiver coil 1106 is used to charge the battery 214, which is used at a later time to power one or more of the components of the UAV 1100. The example process may similarly be implemented by any of the example UAVs 202, 800, 900, 1000 disclosed in connection with FIGS. 3B, 8, 9 and 10.

In some examples, the UAV has a movable receiver coil that may move (e.g., tilt) to capture magnetic fields in different directions. For example, in the illustrated example of FIG. 11A, the receiver coil 1106 is tiltable via the axle 1108. At block 1204 of FIG. 12, the sensor(s) 1110 (FIG. 11A) detect the direction of travel of the UAV 1100. The sensor(s) 1110 may include accelerometers, gyroscopes and/or other devices to detect a direction of travel. At block 1204, the controller 1112 (FIG. 11A) determines if the direction of travel has change (e.g., based on a change measured by one or more of the sensor(s) 1110). If there has been no change in direction, the electronics power controller 320 (FIG. 3B) continues to supply power from the receiver coil to the one or more components. If the direction of travel has changed, the controller 1112 determines an angle to tilt the receiver coil 1106 based on the changed direction of travel (block 1206), and the motor 1114 activates to rotate the axle 1108 to tilt the receiver coil 1106. For example, if spiral transmitter coils (e.g., the transmitter coil 402 and/or the spiral transmitter coil 700) are implemented in the horizontal and vertical sections of a race track, then the direction of the magnetic field is in the direction of travel. If the UAV 1100 is traveling through a horizontal track section, the receiver coil 1106 is oriented in the vertical direction to capture the magnetic flux. If the UAV 1100 changes direction and travels through a vertical track section, the motor 1114 rotates the receiver coil 1106 to a horizontal orientation to capture the magnetic flux in the vertical direction. At block 1202, the electronics power controller 320 continues to supply power from the receiver coil 1106 to the one or more components of the UAV 1100.

Figure 13:
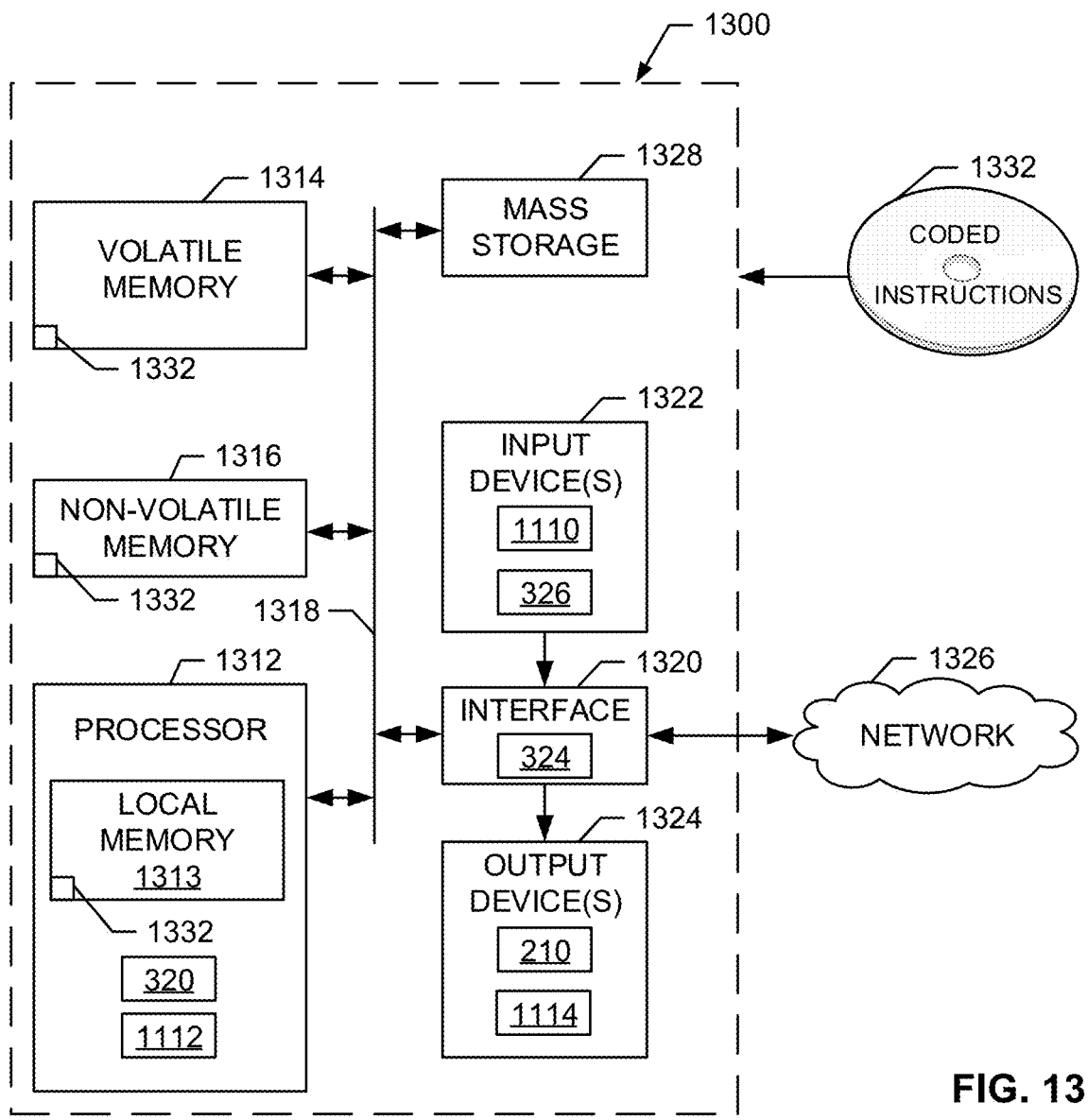
FIG. 13 is a block diagram of an example processor system structured to execute example machine readable instructions represented at least in part by FIG. 12 to implement the example UAVs of FIGS. 2 and 8-11B.

FIG. 13 is a block diagram of an example processor platform 1300 capable of executing the instructions of FIG. 12 to implement the example UAVs 200, 800, 900, 1000, 1100 of FIGS. 2 and 8-11B. The processor platform 1300 can be, for example, a server, a personal computer, a mobile device (e.g., a cell phone, a smart phone, a tablet such as an iPad™), a personal digital assistant (PDA), or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer. In some disclosed examples, the processor 1312 may implement the example electronics power controller 320 and/or the example processor controller 1112.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system. In some examples disclosed herein, the example input device(s) 1322 implement the example sensor(s) 1110 and/or the example camera 326.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1320 of the illustrated example, thus, typically includes a graphics driver card, a graphics driver chip or a graphics driver processor. In examples disclosed herein, the example output devices 1324 implement the example electric motor(s) 210 and/or the motor 1114.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.). The example interface circuit 1320 may implement the example communication system 324.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and digital versatile disk (DVD) drives.

Coded instructions 1332 of FIG. 12 may be stored in the mass storage device 1328, in the volatile memory 1314, in the non-volatile memory 1316, and/or on a removable tangible computer readable storage medium such as a CD or DVD.

Example methods, apparatus/systems and articles of manufacture to wirelessly power a UAV are disclosed herein. Further examples and combinations thereof include the following:

Example 1 includes an unmanned aerial vehicle including an electric motor to drive a rotor, a receiver coil to be induced with an alternating current when the receiver coil is disposed in an alternating magnetic field, and an electronics power controller to supply power to the electric motor based on the alternating current induced in the receiver coil.

Example 2 includes the unmanned aerial vehicle of Example 1, wherein the electronics power controller includes a rectifier to convert the alternating current into a direct current signal, and the direct current signal is to power the electric motor.

Example 3 includes the unmanned aerial vehicle of any one of Examples 1 or 2, further including a battery, and the direct current signal is to charge the battery.

Example 4 includes the unmanned aerial vehicle of any one of Examples 1-3, wherein the receiver coil is disposed outside of a diameter of the rotor.

Example 5 includes the unmanned aerial vehicle of any one of Examples 1-4, further including a plurality of rotors, and the receiver coil is disposed out diameters of the rotors.

Example 6 includes the unmanned aerial vehicle of any one of Examples 1-5, further including a camera to record an image of an environment in front of the unmanned aerial vehicle, and the electronics power controller is to supply power to the camera based on the alternating current induced in the receiver coil.

Example 7 includes the unmanned aerial vehicle of Example 6, further including a communication system to transmit the image to a driver of the unmanned aerial vehicle, and the electronics power controller is to supply power to the communication system based on the alternating current induced in the receiver coil.

Example 8 includes the unmanned aerial vehicle of any one of Examples 1-7, wherein the receiver coil is movable relative to a body of the unmanned aerial vehicle.

Example 9 includes the unmanned aerial vehicle of any one of Examples 1-8, wherein the receiver coil is movable from a substantially horizontal orientation to a substantially vertical orientation.

Example 10 includes the unmanned aerial vehicle of any one of Examples 1-9, further including an axle coupled to the receiver coil and a motor to rotate the axle to tilt the receiver coil.

Example 11 includes the unmanned aerial vehicle of any one of Examples 1-7, wherein the receiver coil includes a plurality of loops facing different directions.

Example 12 includes an apparatus including a transmitter coil defining a passageway through which an unmanned aerial vehicle is to fly and a transmitter circuit to generate an alternating current in the transmitter coil to create an alternating magnetic field and power the unmanned aerial vehicle.

Example 13 includes the apparatus of Example 12, wherein the transmitter coil is to generate the alternating magnetic field in a direction perpendicular to a central axis of the transmitter coil.

Example 14 includes the apparatus of any one of Examples 12 or 13, wherein the transmitter coil is a birdcage transmitter coil including a first end ring, a second end ring spaced apart from the first end ring, and a plurality of rungs between the first and second end rings.

Example 15 includes the apparatus of Example 12, wherein the transmitter coil is to generate the alternating magnetic field in a direction parallel to a central axis of the transmitter coil.

Example 16 includes the apparatus of any one of Examples 12 or 15, wherein the transmittal coil is spiral shaped.

Example 17 includes an apparatus including a track section having a transmitter coil to generate an alternating magnetic field and an unmanned aerial vehicle (UAV) having a receiver coil, the alternating magnetic field to induce an alternating current in the receiver coil when the UAV is disposed in the alternating magnetic field.

Example 18 includes the apparatus of Example 17, wherein the alternating magnetic field is generated in a passageway defined by the transmitter coil.

Example 19 includes the apparatus of any one of Examples 17 or 18, wherein the track section is a horizontal track section, and wherein the alternating magnetic field is in a vertical direction.

Example 20 includes the apparatus of any one of Examples 17-19, wherein the transmitter coil is a birdcage transmitter coil.

Example 21 includes the apparatus of any one of Examples 17 or 18, wherein the track section is a vertical track section, and wherein the alternating magnetic field is in a vertical direction.

Example 22 includes the apparatus of any one of Examples 17, 18 or 21, wherein the transmitter coil is a spiral transmitter coil.

Example 23 includes the apparatus of any one of Examples 17-22, wherein the receiver coil of the UAV remains substantially horizontal while the UAV flies.

Example 24 includes the apparatus of any one of Examples 17-22, wherein the receiver coil is tiltable relative to a body of the UAV.

Example 25 includes the apparatus of any one of Examples 17-24, wherein the track section is a first track section, the transmitter coil is a first transmitter coil and the alternating magnetic field is a first alternating magnetic field, further including a second track section operatively coupled to the first track section, and the second track section includes a second transmitter coil to generate a second alternating magnetic field.

Example 26 includes the apparatus of Example 25, wherein the first alternating magnetic field is in a vertical direction and the second alternating magnetic field is in a horizontal direction.

From the foregoing, it will be appreciated that the above disclosed methods, apparatus/systems and articles of manufacture enable wireless powering of a UAV via inductive coupling from a transmitter coil, which may define a track or track section through which the UAV flies. In examples disclosed herein, the power received via inductive coupling enables the UAV to operate (e.g., to operate rotors and/or circuitry within the UAV) and/or charge a power storage circuit (e.g., a battery) of the UAV. Operating using power received via the inductive coupling and/or charging a battery of the UAV enables the UAV to travel for farther distances without having to stop to change and/or recharge a battery of the UAV. As a result, UAV races and/or other activities may be completed without the need for the stopping during the race and/or activity to change or recharge a battery of the UAV. Also, by eliminating or reducing the size of the battery, example UAVS are relatively lighter and more aerodynamic and, thus, can achieve higher speeds and accelerations than known UAVs.

Although certain example methods, apparatus and articles of manufacture have been disclosed herein, the scope of coverage of this patent is not limited thereto. On the contrary, this patent covers all methods, apparatus/systems and articles of manufacture fairly falling within the scope of the claims of this patent.

What is claimed is:

1. An apparatus comprising:
a first transmitter coil having a first end, a second end, and a first passageway between the first end and the second end of the first transmitter coil;
a second transmitter coil having a first end, a second end, and a second passageway between the first end and the second end of the second transmitter coil, the first end of the second transmitter coil disposed adjacent the second end of the first transmitter coil such that the first and second transmitter coils form a substantially continuous passageway through which an unmanned aerial vehicle is to fly; and
a transmitter circuit to generate an alternating current in the first and second transmitter coils to create an alternating magnetic field and power the unmanned aerial vehicle as the unmanned aerial vehicle sequentially flies through the first and second passageways.

2. The apparatus of claim 1, wherein the first transmitter coil is to generate the alternating magnetic field in the first passageway in a direction perpendicular to a central axis of the first transmitter coil.

3. The apparatus of claim 2, wherein the first transmitter coil is a birdcage transmitter coil including a first end ring, a second end ring spaced apart from the first end ring, and a plurality of rungs between the first and second end rings.

4. The apparatus of claim 1, wherein the first transmitter coil is to generate the alternating magnetic field in the first passageway in a direction parallel to a central axis of the first transmitter coil.

5. The apparatus of claim 4, wherein the first transmittal coil is spiral shaped.

6. The apparatus of claim 1, further including
the unmanned aerial vehicle, the unmanned aerial vehicle having a body and a receiver coil that is movable relative to the body, the alternating magnetic field to induce an alternating current in the receiver coil when the unmanned aerial vehicle flies through the alternating magnetic field in the first and second passageways.

7. The apparatus of claim 6, further including a horizontal track section, and wherein the alternating magnetic field is in a vertical direction in the horizontal track section.

8. The apparatus of claim 7, wherein the first transmitter coil is a birdcage transmitter coil.

9. The apparatus of claim 7, further including a vertical track section, and wherein the alternating magnetic field is in a vertical direction in the vertical track section.

10. The apparatus of claim 9, wherein the first transmitter coil is a spiral transmitter coil.

11. The apparatus of claim 6, wherein the receiver coil is coupled to an axle that is rotatable to tilt the receiver coil.

12. The apparatus of claim 11, wherein the unmanned aerial vehicle includes a motor to rotate the axle.

13. The apparatus of claim 12, wherein the unmanned aerial vehicle includes:
a sensor to detect a direction of travel of the unmanned aerial vehicle; and
a controller to control the motor to rotate the axle based on the direction of travel.

14. The apparatus of claim 1, wherein the alternating magnetic field in the first passageway is in a same direction as the alternating magnetic field in the second passageway.

15. The apparatus of claim 1, wherein the first transmitter coil forms a horizontal track section and the second transmitter coil forms a vertical track section.

16. The apparatus of claim 1, wherein the first passageway is curved.

* * * * *